Jan. 13, 1931. T. ELLIOTT 1,788,620
FEEDER FOR COTTON TRAMPERS
Filed Dec. 26, 1928
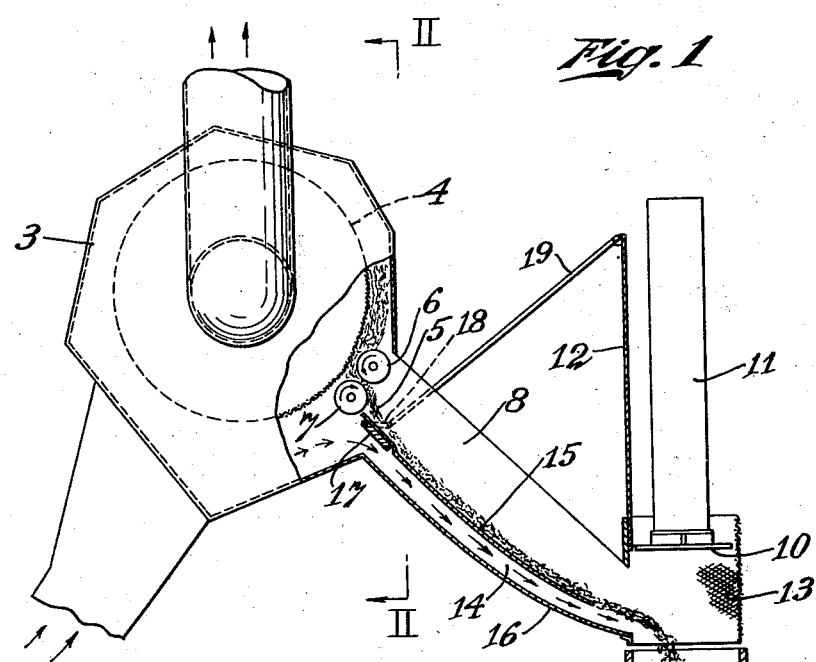
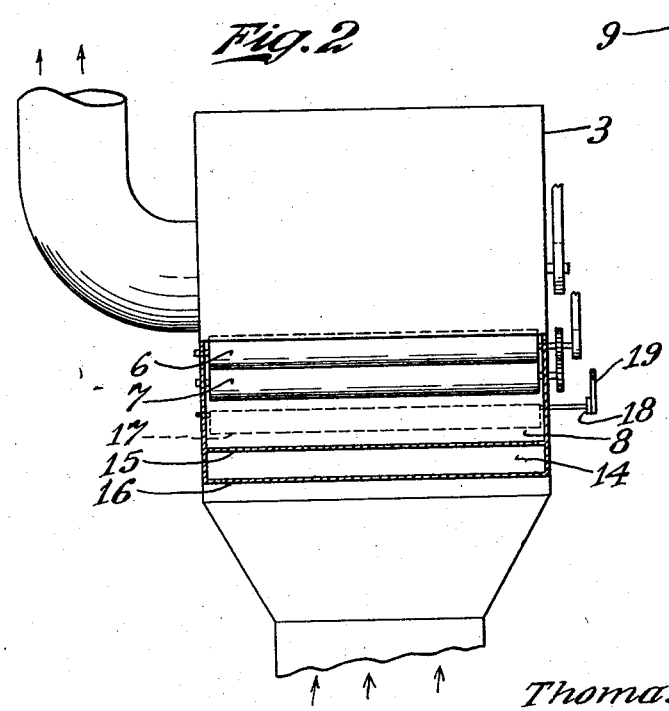
Inventor
Thomas Elliott
By Johnston & Jennings
Attorneys Patented Jan. 13, 1931

1,788,620

UNITED STATES PATENT OFFICE

THOMAS ELLIOTT, OF BIRMINGHAM, ALABAMA, ASSIGNOR TO CONTINENTAL GIN COMPANY, A CORPORATION OF DELAWARE

FEEDER FOR COTTON TRAMPERS

Application filed December 26, 1928. Serial No. 328,512.

My invention relates to a feeder for cotton baling trampers and the like, wherein it is of importance to so feed the cotton that the resulting bale will have substantially uniform density.

Heretofore, various mechanical feeders have been employed in association with the lint slide leading from the condenser to the baling press box but none of these, so far as I am advised, has so uniformly distributed the cotton across the press box as to enable the tramper to build up therein a bale of substantially uniform thickness or density. The lack of such uniformity is objectionable for many reasons, chief among which is that it is quite difficult to compress such bales.

I have conceived that the problem of producing the uniform bale can be solved by blowing the cotton into the press box so as to fill the latter, to all practical intents and purposes, to a uniform density, and it will therefore result, as the tramper operates, that a bale of uniform density, balanced and symmetrical as to shape and conformation, will result in the press box.

More particularly I propose the use of an air duct having substantially the width of, and preferably opening below the discharge end of the lint slide leading to the press box, so that the air blast will open up the cotton as it blows it into the box until the latter is filled below the tramper follow-block. The loose cotton free of mechanical pressure, will so place itself in the upper press box as to provide a mass of substantially constant density throughout the cross-section of such box.

My invention also contemplates diverting the air from the condenser, as a most convenient source of air pressure, and causing it to flow along under the line slide and upwardly past the delivery end of the latter adjacent to the press box, so that it will tend to discharge the cotton into the upper part of such box and fill it and the screened guide chamber above the press box quickly and uniformly.

As a simple means for controlling the feed of cotton, I propose to provide a valve means, automatically responsive to the movement of the tramper follow-block, which will cause the feeder air blast to function only when the block is raised and will cut it off during the working stroke of the tramper.

While it is to be understood that my invention is capable of various embodiments, I have shown in the accompanying drawings what I consider the simplest and, therefore, the preferred means for carrying my invention into effect, and I shall describe the same in detail, but without intending to limit myself specifically thereto, in the following specification and claims.

According to the drawings:

Fig. 1 illustrates in side elevation, partly broken away, a condenser having a lint slide delivering into a conventional type of baling press box, the slide, box and tramper follow box being shown in vertical cross-section.

Fig. 2 is a cross-sectional view taken on the line II—II of Fig. 1.

Similar reference numerals refer to similar parts throughout the drawings.

In the embodiment of my invention illustrated, I show a condenser box 3 to which the lint cotton from the gins is fed in the manner well understood in this art, and caused to collect therein upon the rotating condenser drum 4 from which it is removed in the form of a bat 5 that is fed between a pair of rolls 6 and 7 and delivered to a lint slide 8 leading to the press box 9 into which the tramper follow-block 10 moves to pack the cotton as the bale is made up. All of the parts as thus far described may be of any standard construction, those shown being merely illustrative.

The tramper follow-block 10 is secured to the plunger operated by an air or steam cylinder 11 or any mechanical means which illustrates conventionally a reciprocating drive for the tramper. The block 10 carries with it the usual lint shield 12 which holds back the cotton being fed down the slide during the working stroke of the tramper from gaining access to the press box or to the screened guide chamber 13, provided as is customary above the press box.

The type of condenser that I have shown is one in which the air is withdrawn axially through the end of the casing remote from that seen in Fig. 1. I provide an air duct 14, preferably formed between the side walls of the slide 8 and between the concave curved bottom wall 15 of the slide and a similarly curved bottom wall 16 of the duct.

It will be noted that the slide bottom 15 stops short of the bottom 16 of the air duct and that the air duct opens at its upper end into the condenser casing from which it derives a current of air under pressure responsive to the control of a pivoted valve 17. This valve when open seats in an offset at the upper end of the slide bottom 15 so that its under surface stands substantially flush with the top wall of the air duct. The valve has an operating crank 18, which is connected by a bar 19 to the top of the tramper lint slide so that as the latter starts downwardly from its extreme raised position, as shown in Fig. 1, it will act quickly to rock the valve 17 into position to stop the air flow through the duct 14. In like manner, as the follow-block 10 approaches its raised position, it will, by the means shown, open the valve 17 and thus cause a blast of air to flow through the duct 14 with the result which will now be described.

During the working stroke of the follow-block, the air being cut off, the lint shield 13 will cause the cotton being fed down the slide to bank up and collect at the lower end of the slide and above the open end of the air duct. As soon as the follow-block in rising reaches a critical position, its shield opens the press box 9 to receive cotton from the lint slide and it opens the valve to admit a current of air to the duct 14, which air rushes down through the duct and, following the direction of the arrows, strikes the accumulated mass of cotton at the base of the lint slide acting to open it up and direct it in a vortex or whirl into the press box until it completely fills the latter and the screened guide chamber above it.

I have observed that in thus filling the press box the air distributes the cotton so uniformly that the resulting bales are not objectionable by reason of varying density nor abnormal shape. It will of course be understood that after the box 9 and the screened guide chamber are thus filled, the follow-block moves downwardly and presses a layer of cotton into the press box and in this manner as the follow-block reciprocates a uniform density bale is built up.

Though I have described with great particularity the details of the embodiment of the invention herein shown, it is not to be construed that I am limited thereto, as changes in arrangement and substitution of equivalents may be made by those skilled in the art without departing from the invention as defined in the appended claims.

What I claim as new, is:—

1. The combination with a condenser, a press box, and a tramper mechanism comprising a screened guide and a reciprocable follow-block therein, of a chute adapted to deliver cotton from the condenser into said screened guide, a duct adapted to divert a blast of air from said condenser and direct it against cotton at the discharge end of said slide in a direction to blow said box and screened guide full of cotton, and valve means responsive to the follow-block movements for starting and stopping the air blast.

2. The combination with a condenser adapted to receive air under pressure, of a lint slide leading therefrom, an air duct leading along under said slide and open at its upper end to the condenser and at its lower end to the lint slide, a valve controlling the flow of air through said duct, a press box, a screened follow-block guide above the press box into which the duct and slide are adapted to discharge, and a tramper follow-block adapted to control said valve and to compress the masses of cotton intermittently blown into said press box below it.

3. The combination with a condenser adapted to receive air under pressure, of a lint slide leading therefrom, an air duct leading along under said slide and open at its upper end to the condenser and at its lower end to the lint slide, a valve for controlling the flow of air through said duct and positioned at the upper end thereof adjacent the condenser, a press box at the lower end of the slide, a reciprocable tramper for compressing lint in the press box, and means operable upon reciprocation of the tramper for intermittently opening and closing the valve.

In testimony whereof I affix my signature.

THOMAS ELLIOTT.